United States Patent [19]

Bradley, Jr.

[11] 4,331,393
[45] May 25, 1982

[54] OPHTHALMIC FITTING SET AND METHOD

[76] Inventor: James B. Bradley, Jr., 110 Monteleon Dr., West Monroe, La. 71291

[21] Appl. No.: 802,072

[22] Filed: May 31, 1977

Related U.S. Application Data

[63] Continuation of Ser. No. 525,842, Nov. 21, 1974, Pat. No. 4,045,137.

[51] Int. Cl.³ .......... G02C 1/00; G02C 5/04; G02C 5/12
[52] U.S. Cl. ........................ 351/88; 351/78; 351/128; 351/137; 351/138
[58] Field of Search .......... 351/132, 128, 137, 139, 351/138, 88, 76, 77, 78, 80

[56] References Cited

U.S. PATENT DOCUMENTS

| | | | |
|---|---|---|---|
| 375,541 | 12/1887 | Eccleston et al. | 351/138 |
| 1,205,716 | 11/1916 | Day | 351/132 |
| 2,881,661 | 4/1959 | Laisne | 351/138 |
| 3,345,121 | 10/1967 | De Angelis | 351/128 |

Primary Examiner—John K. Corbin
Assistant Examiner—Rodney B. Bovernick
Attorney, Agent, or Firm—Norvell E. Von Behren

[57] ABSTRACT

A novel ophthalmic device for use by an optometrist or the like which comprises a unique fitting eyeglass frame for use with a plurality of detachable nosepiece attachments which allows the optometrist to quickly and more properly fit each patient's nose with a nose bridge that is suitably designed for the configuration of his nose. The removable nosepiece attachments are pivotably connected to the novel ophthalmic frame thereby allowing a front-to-rear adjustment and lacking of the nosepiece on the ophthalmic frame. A portion of the plurality of adjustable nosepieces may contain a coated, soft, porous material in the area of juxtaposition to the user's nose to provide a more comfortable fit for the user.

By the use of the new and novel ophthalmic fitting frame and removable nosepieces in combination with the new and novel methods herein disclosed, the optometrist or the like is able to properly fit the eyeglass user with a combination of lens, frame and removable nosepieces which may then be ordered by the user in his particular color and style according to his individual taste.

8 Claims, 13 Drawing Figures

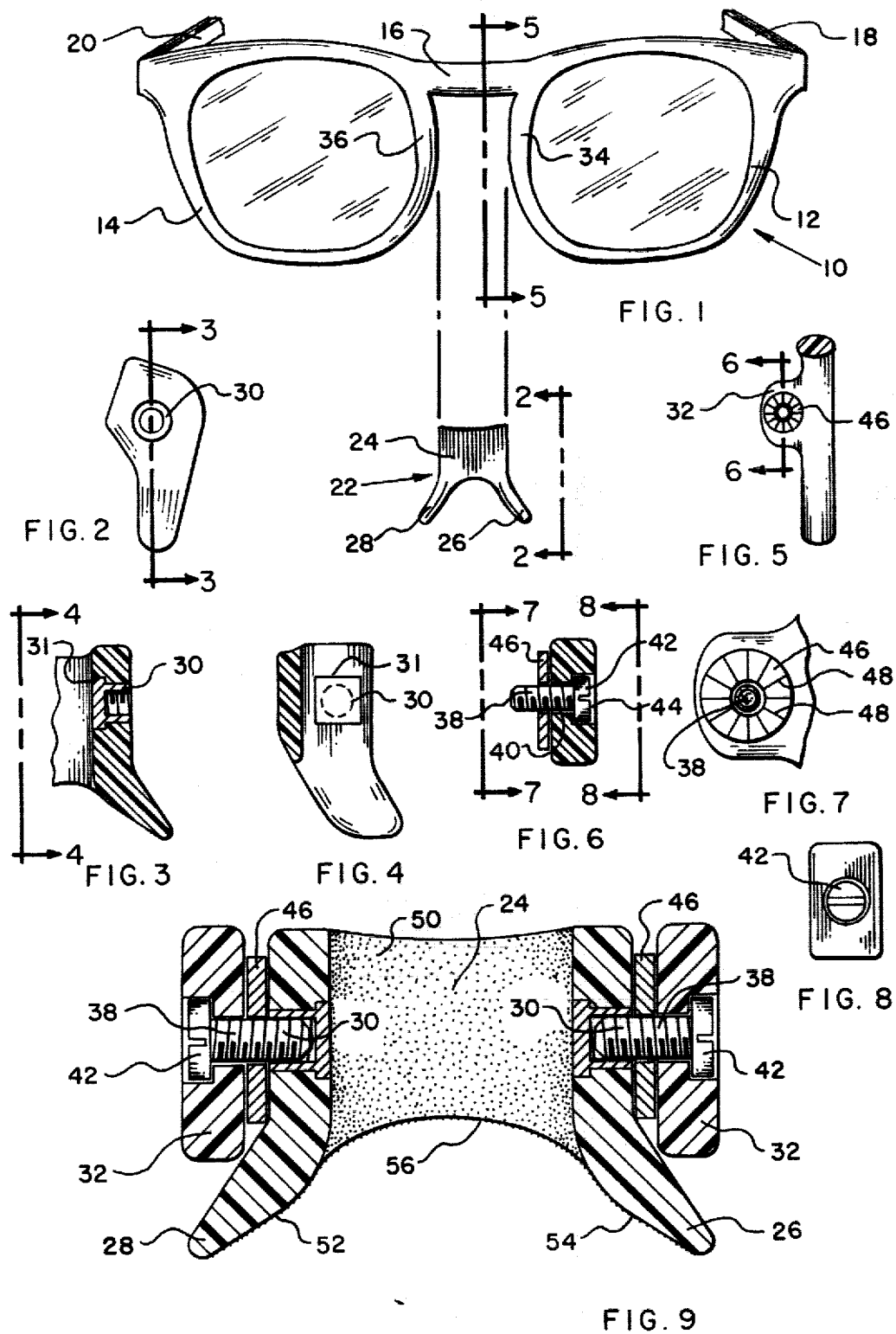

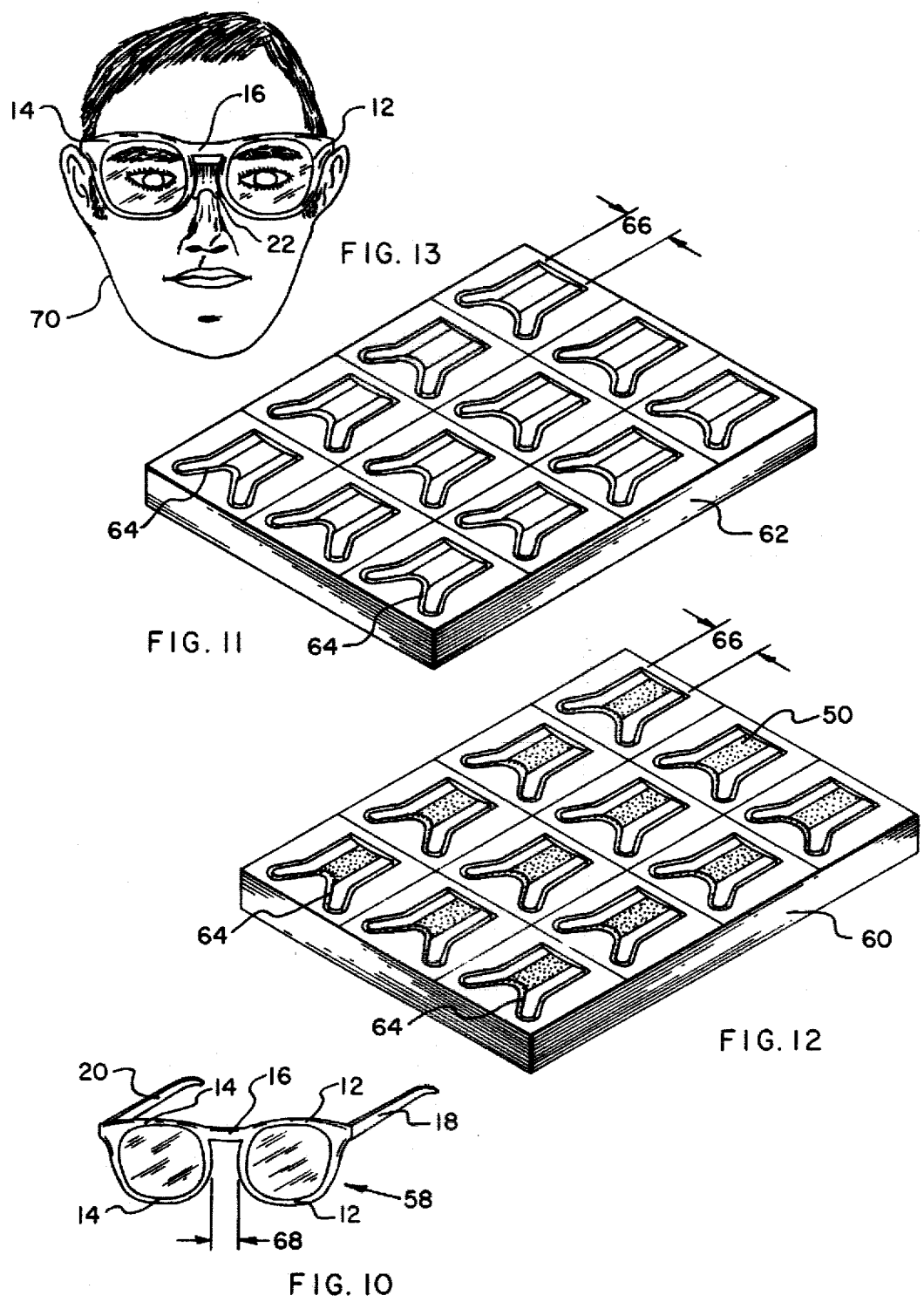

OPHTHALMIC FITTING SET AND METHOD

This is a continuation of application Ser. No. 525,842 filed Nov. 21, 1974, now U.S. Pat. No. 4,045,137.

CROSS REFERENCES TO RELATED APPLICATIONS

Allowed patent application Ser. No. 525,842, now U.S. Pat. No. 4,045,137 filed Nov. 21, 1974 by James B. Bradley, Jr. and entitled "Ophthalmic Device and Method".

Allowed patent application Ser. No. 573,907, now U.S. Pat. No. 4,032,223 filed May 2, 1975 by James B. Bradley, Jr. and entitled "Ophthalmic Method and Device".

Pending patent application Ser. No. 783,946, filed April 1, 1977 by James B. Bradley, Jr. and entitled "Ophthalmic Method and Device".

Pending patent application Ser. No. 790,382, now U.S. Pat. No. 4,131,341 filed April 25, 1977 by James B. Bradley, Jr. and entitled "Ophthalmic Device".

BACKGROUND OF THE INVENTION

This invention relates generally to an improved ophthalmic fitting set and in particular to a new and novel device for use also by an optometrist or the like to insure a proper fit for each individual patient.

The usual procedure for the selection and fitting of eyeglasses by an optometrist generally involves a two-step process wherein in the first step the user's eyes are checked by the optometrist or the like to ascertain the precise degree of correction required in the lens of the eyeglass. After this has been determined the patient is generally escorted to a separate sitting room where a large selection of styles and colors of eyeglass frames are shown to him. After a long series of trial and error fittings of the various styles and colors of glasses on the user, the final selection is generally made by the patient and his particular set of glasses are then tailor-made by the optometrist by grinding the prescription formula for the lens and inserting the proper lens in the selected frame.

Such fitting techniques, while many times successful, are not necessarily always successful since standard frames heretofore known generally comprise one of two types which are not necessarily satisfactory for all users. Such frames generally utilize molded nosepieces made of plastic and having relatively small contact area with the nosepiece being fixed to the eyeglass frame so that no adjustment front-to-rear is possible to take into account different size and shaped noses. The other type of common nosepiece used with frames generally sold today consists of a type of floating nosepiece which may be formed of a metal face or sometimes a plastic face.

It should be recognized that these types of nosepiece mounts are often considered uncomfortable and can cause pressure indentations in the skin of the nose which can be unsightly and irritating after a prolonged use of the poorly fit eyeglass. An ill-fitted pair of eyeglasses such as this often causes a second problem to the user which is the problem of slippage of glasses on the user's nose which can be very annoying to say the least. It is felt that such slippage occurs because of the poor frictional fit on the nose of the user resulting primarily from the ill-fitted nosepieces on the eyeglass.

For a more fuller understanding of the prior art type of nosepieces available for eyeglasses, reference should be made to the following U.S. patents which all generally teach what has been before described as the fixed type of nosepiece: U.S. Pat. No. 115,302, issued to E. M. Splaine, June 20, 1939; U.S. Pat. No. 129,710, issued to H. J. Langknecht, Sept. 30, 1941; U.S. Pat. No. 200,667, issued to V. A. Downie et al, Mar. 23, 1965; U.S. Pat. No. 3,345,121, issued to A. De Angelis, Oct. 3, 1967; U.S. Pat. No. 3,391,976, issued to F. W. Lindblom, July 9, 1968; U.S. Pat. No. 2,612,076, issued to W. Dietz, Sept. 30, 1952; U.S. Pat. No. 3,189,913, issued to G. R. Hoffmaster, June 15, 1965; U.S. Pat. No. 3,701,592, issued to J. J. Fernandez, Oct. 31, 1972; U.S. Pat. No. 3,758,203, issued to H. Lipchik et al, Sept. 11, 1973; U.S. Pat. No. 3,365,263, issued to D. P. Allen, Jan. 23, 1968; U.S. Pat. No. 2,148,397, issued to F. Bock, Feb. 21, 1939; U.S. Pat. No. 2,006,917, issued to C. J. Haag, July 2, 1935; U.S. Pat. No. 2,345,065, issued to G. E. Nerney, Mar. 28, 1944; and U.S. Pat. No. 2,354,603, issued to R. Malcom, July 25, 1944.

These patents, while not considered especially pertinent to the subject application, are cited for the purpose of showing the extensive state of art and the extensive need for improvement in nosepiece designs.

Eyeglass nosepieces of the floating type are typified by the following U.S. patents which are considered more pertinent to the applicant's invention inasmuch as they overcome the problems inherent in the fixed type of nosepiece but are not necessarily an improvement over the applicant's new and novel invention: U.S. Pat. No. 3,476,468, issued to J. A. Fortenberry, Nov. 4, 1969; U.S. Pat. No. 3,515,467, issued to D. A. Stewart, June 2, 1970; U.S. Pat. No. 2,640,391, issued to E. H. Moseley, June 2, 1953; U.S. Pat. No. 3,233,956, issued to A. De Angelis, Feb. 8, 1966; and U.S. Pat. No. 3,233,250, issued to S. Jonassen, Feb. 8, 1966.

In addition to the before cited reference patents by the applicant, the examiner cited the following patents in the before mentioned Bradley application Ser. No. 525,842:

| E. B. Meyrowitz | U.S. 329,474 | Issued 11/03/1885 |
| W. H. Eccleston et al | U.S. 375,541 | Issued 12/27/1887 |
| J. A. Fortenberry | U.S. 3,476,468 | Issued 11/04/1969 |
| Boucle | France 1,245,938 | Issued 10/03/1960 |
| A. S. Weaver | U.S. 636,595 | Issued 11/07/1899 |

The examiner also cited the following patents in the before mentioned Bradley application Ser. No. 573,907:

| J. A. Fortenberry | U.S. 3,476,468 | Issued 11/04/1969 |
| A. S. Weaver | U.S. 636,595 | Issued 11/07/1899 |
| G. H. Emerson | U.S. 388,545 | Issued 8/28/1888 |

SUMMARY OF THE INVENTION

In order to overcome the problems inherent in the prior art devices hereinbefore described there is provided by the applicant's invention a new and improved ophthalmic fitting set using the applicants new and novel fitting frame which comprises a pair of lens mounts having a bridge and temples attached thereto in combination with a removable and replaceable nosepiece attachment for positioning between the lens mount and beneath the bridge in combination with means for removably attaching and locking the nosepiece to the device, the removable attachment, being constructed to allow the nosepiece to be pivoted front-to-rear about an axis and then locked in place by two screws thereby allowing the user of the device to obtain a comfortable fit of his particular eyeglass. The removable nosepiece of the subject invention is a generally inverted U-shaped member which is sized to comform to a person's nose and can have placed thereupon a soft, porous coating which aids in preventing slippage of the eyepiece on the user's nose. By the use of a plurality of the novel nosepiece attachments, the optometrist is able to quickly and easily fit the user of the device with a plurality of various sized nosepiece attachments thereby insuring a proper fit on his particular eyeglass.

Accordingly it is an object of the invention to provide a new and novel device for use by an optometrist or the like which aids him in alleviating the problems encountered in the fitting of prior art type eyeglass frames.

Another object of the invention is to provide a new and novel ophthalmic fitting set which may be utilized in the proper fitting of eyeglasses by allowing the optometrist to have at his disposal a plurality of such nosepieces with each nosepiece having a different size and shape opening.

Still yet another object of the invention is to provide an ophthalmic fitting set having an eyeglass frame which has a removable nosepiece which may be adjusted front-to-rear and readjusted relatively quickly by the optometrist and then locked in place by two screws.

Yet another object of the invention is to provide a new and novel method for use by the optometrist in the proper and complete fitting of eyeglass frames which allows the user of the frame to be more fully satisfied with the accompanying fit.

Still yet another object of the invention is to provide a new and novel ophthalmic fitting set having an eyeglass frame having an adjustable nosepiece and also a non-slip soft, porous coating applied thereto.

These and other objects and advantages of the invention will become apparent from a study of the drawings attached herewith and from a reading of the description of the preferred embodiment to be described more fully hereinafter.

BRIEF DESCRIPTION OF THE DRAWINGS

FIG. 1 is a front view of the subject ophthalmic frame used in the fitting set showing the nosepiece attachment exploded from the frame;

FIG. 2 is a side view taken along line 2—2 of FIG. 1 showing the general configuration of the nosepiece attachment;

FIG. 3 is a partial sectional view taken along line 3—3 of FIG. 2 showing a female receptacle, which will be described more fully hereinafter, imbedded in the nosepiece body;

FIG. 4 is a side view taken along line 4—4 of FIG. 3;

FIG. 5 is a partial sectional view taken along line 5—5 of FIG. 1;

FIG. 6 is a sectional view taken along line 6—6 of FIG. 5 showing in detail the screw and shim attachment in place in the eyeglass frame;

FIG. 7 is an enlarged side view taken along line 7—7 of FIG. 6;

FIG. 8 is a side view taken along line 8—8 of FIG. 6;

FIG. 9 is an enlarged sectional view of the nosepiece shown attached to the eyeglass frame and showing the mating parts in their respective positions;

FIG. 10 is a perspective view of an ophthalmic frame similar to the frame shown in FIG. 1 without the nosepiece attached;

FIG. 11 is a perspective view showing an optometrist's tray having positioned therein a plurality of removable nosepieces;

FIG. 12 is a perspective view of a second optometrist's tray showing a second plurality of nosepiece used in combination with the nosepieces shown in FIG. 11 in the method of the invention; and FIG. 13 is a front view of a user of the device showing the ophthalmic frame and one nosepiece in position on the frame.

DESCRIPTION OF THE PREFERRED EMBODIMENT

Referring now to the drawings in general and in particular to FIGS. 1 and 2 of the drawings, there is shown in FIG. 1 an opthalmic frame utilized in the subject invention, shown generally by the numeral 10 which comprises a pair of lens mounts 12 and 14, having a bridge 16 spanning the lens mounts and rigidly attached thereto. On each side of the lens mounts 12 and 14, as is well known in the art, are a pair of temples 18 and 20 which are fixidly attached to the lens mounts and are pivotably mounted on hinges not shown in the drawing.

Positioned below the frame 10 and shown exploded in FIG. 1 is a removable and replaceable nosepiece attachment 22 which may be positioned between the lens mounts 12 and 14 and beneath the bridge 16. The nosepiece attachment 22 is removably attached to the lens mounts and may be pivoted about the lens mounts and locked thereto as will be described more fully hereinafter during use of the device by the optometrist during the fitting procedure in order to effect a comfortable fit for the user of the device. The pivoting and locking of the nosepiece 22 is accomplished by the use of a plurality of female receptacles or locking nuts imbedded in the nosepiece in combination with a plurality of screws positioned in a protruding portion or lug to the rear of the lens mounts as will be more fully described hereinafter.

The nosepiece 22 may be formed of plastic or of some other suitable material and is formed as a generally inverted U-shaped member having an upstanding portion 24 and two downwardly protruding and outwardly extending legs 26 and 28, with the entire nosepiece 22 being sized to conform to the bridge of the user's nose. By referring to FIG. 2 of the drawing, there is shown a side view taken along line 2—2 of FIG. 1 showing the general configuration of the side of the removable nosepiece 22.

Referring now to FIGS. 3 and 4, there will be described the beforementioned female receptacles or locking nuts imbedded in each side of the nosepiece 22. The upstanding portion 24 has imbedded therein on each side thereof a female receptacle 30 which may generally be formed of brass or some other suitable material and is imbedded in the nosepiece portion during the manufacturing process and by means well known in the art. As is shown more fully in FIG. 4 of the drawing, the head 31 of the female receptacle 30 is generally square or rectangularly shaped to prevent turning of the receptacle whenever the mating screw is positioned in the receptacle as will be more fully described hereinafter.

Referring now to FIGS. 5, 6, 7 and 8 of the drawing, there will be described in more detail the mating screw portion of the pivotable mounting which is utilized in combination with the female receptacle 30 to provide front-to-rear adjustability of the nosepiece 22. FIG. 5 of the drawing is a side view taken along line 5—5 of FIG. 1 showing a protruding portion or lug 32 which is formed to the rear of the vertical section 34 of the lens mount 12. In a similar manner, but not shown in the drawing, a similar protruding portion would be formed in the vertical section 36 of the lens mount 14. The lugs 32 would be formed integrally with the formation of the lens mounts 12 and 14 and would be preferably molded in place and would be sized of a sufficient diameter to receive the adjusting screws which are positioned in the female receptacles 30. By referring to FIG. 6 of the drawing, there is shown a sectional view taken along line 6—6 of FIG. 5 showing these screws 38 positioned within a drilled hole 40 formed in the lug 32 with the head 42 of the screw being positioned within a somewhat larger hole 44 to countersink the head of the screw within the surface of the lug 32.

Positioned on the outside of the screws 38 is a washer or shim 46 which has a plurality of radially raised surfaces or teeth 48 formed on both sides thereof as is more fully shown in FIG. 7 of the drawing. The function of the radially raised surfaces or teeth 48 is to prevent turning of the nosepiece after the optometrist has fit the nosepiece to the desired position on the eyeglass frame which is comfortable to the user and after he has tightened the screws 38 in the female receptacles 30. Since the nosepiece 22 and the protruding lugs 32 are formed generally of a plastic material, the raised teeth 48 on the metallic shim 46 will bite into the plastic and prevent turning of the nosepiece out of its preferred alignment.

Referring now to FIG. 9 of the drawing, there is shown in an enlarged sectional view, an assembly of the various pieces and parts hereinbefore described and shown in FIGS. 1-8. FIG. 9 shows the nosepiece attachment 22 positioned between the vertical sections 34 and 36 of the lens mounts 12 and 14 and shows the nosepiece attachment pivotably attached to the vertical section by means of the plurality of screws 38 positioned in the female receptacles 30. From this it can be readily seen that front-to-rear adjustment is obtainable on the nosepiece 22 by pivoting the nosepiece on the screw 38 until a comfortable fit is obtained and then simply tightening the screws 38 in the female receptacle 30 or locking nuts until a tight fit is obtained against the shims 46 then rigidly fastening or locking the nosepiece in a pre-determined position and insuring is non-rotation.

In the preferred embodiment the inner surface or the surface of the nosepiece 22 which is touching the bridge of the user's nose may be coated with a soft, porous material for a more comfortable fit. The soft, porous material or frictional means may be a plastic, rubber or some other suitable material which is preferably sprayed on to the exposed area to aid in preventing slipping of the nosepiece on the user's nose. The soft, porous material also acts as a cushion on the nose bridge to make the eyeglass feel better on the user's nose. In FIG. 9 of the drawing the area which would have the soft, porous frictional coating applied thereto is shown by the stippling 50 which would also be applied to the lower surfaces 52 of the leg 28 and the lower surface 54 of the leg 26 as well as the curved portion of the nosepiece bridge numerically labeled 56.

Referring now to FIGS. 10-13 of the drawing, there will be described in detail the unique method for fitting an eyeglass frame on the nose of the user of the frame by the use of the novel ophthalmic fitting device hereinbefore described. Prior to the fitting procedure, the optometrist has provided himself with an ophthalmic frame 58 of the type before described along with a plurality of trays 60 and 62 containing a plurality of removable nosepieces. The tray 60 is supplied with twelve nosepieces of different sizes designed to fit different sized and shaped noses with each nosepiece having an outer dimension, shown by the numeral 66 corresponding with the inner dimension, shown by the numeral 68, on the ophthalmic frame 58. That is to say each removable nosepiece in the tray 60 is designed to fit within the lens mounts 12 and 14 of the ophthalmic frame and to be held in place by the beforementioned female receptacles and screws. Each of the nosepieces provided in the tray 60 is also supplied with the coated soft, porous cushioning material as shown by the stippled area 50 and as hereinbefore described.

Completing the optometrist's fitting apparatus is the tray 62 which contains a plurality of twelve removable nosepieces similar to the nosepieces contained in the tray 60 with the exception that these nosepieces do not contain the soft, porous material giving the optometrist a choise of twenty-four different sizes and types of nosepieces.

With these tools at hand, the optometrist simply tries a plurality of the noisepieces on the person 70 by positioning the nosepiece in the ophthalmic frame 58 and trying the complete frame on the user until a satisfactory fit is accomplished. The optometrist, by experience, would be able to quickly select one or several nosepieces from the dual tray set to accomodate the nose of the user after viewing the user's particular nose and after ascertaining whether or not the user would prefer to have a coated or a non-coated nosepiece provided for his eyeglasses. It is possible that some users would also desire to own several types of nosepieces which may be comfortable and by the use of the optometrist's set he could select those nosepieces that were suitable to him.

After the selection procedure is complete the optometrist would simply order the selected nosepiece or nosepieces along with the selected type and color of eyeglass frame from an optical supply house. Thereafter he would simply have to fit the user's lens in the selected frame and would only have to adjust the nosepiece for a correct position front-to-rear by using the mating screws and female receptacles as before mentioned.

With the subject new and novel fitting device and by the use of the new and novel fitting method, the optometrist is able to quickly select a nosepiece that fits the patient's nose bridge more comfortably than heretofore possible. With this invention, the user's nosepiece can be adjusted to the angle of the nose bridge because of the front-to-rear adjustability of the device which results in an improved fit of glasses on the user's nose. In addition, with the use of the cushioning, soft coating, if desired, the problem of eyeglass slipping and nose pad indentations as before mentioned is eliminated.

From the foregoing it becomes apparent that all of the objects and advantages have been obtained by the new and novel device and method hereinbefore described as the preferred embodiment, however it should also be apparent that changes can be made in the arrangement of parts and steps of the method without departing from the spirit and scope of the invention as described in the following claims.

Having described my invention, I claim:

1. An ophthalmic fitting set for use by an optometrist or the like comprising:
   (a) an ophthalmic eyeglass frame having formed thereon a pair of lens mounts for receiving a detachable and rigidly lockable nosepiece;
   (b) a plurality of first one piece, preformed, rigid, detachable and lockable nosepieces for positioning on said frame, each nosepiece being sized for a different shape and size nose and being constructed so as to be rigidly lockable on the frame; and
   (c) means associated with said frame and said nosepieces for rigidly attaching one of said lockable nosepieces to said frame after trying a plurality of nosepieces on the user of the device, said attaching means allowing said lockable nosepiece to be rigidly locked in place on said lens mount after being pivoted on said lens mounts to a predetermined position during use of the eyeglass frame.

2. The fitting set as defined in claim 1 further comprising:
   (a) a plurality of second one piece, preformed, rigid, detachable and lockable nosepieces for positioning on said frame, each nosepiece being sized for a different shape and size nose and being constructed so as to be rigidly lockable on the frame, said second detachable nosepieces having formed thereon frictional means on the lower portion of said nosepiece.

3. A method for fitting an eyeglass frame on the nose of the user of frame comprising the steps of:
   (a) providing an eyeglass frame with a removable nosepiece portion;
   (b) providing a plurality of first one piece, preformed, rigid, detachable and lockable nosepieces for said frame, each said nosepiece being formed to fit a different size and shape of nose and being constructed so as to be rigidly lockable on the frame; and
   (c) trying a plurality of said one piece, preformed, rigid nosepieces on the user of the device by positioning and locking said lockable nosepieces in said frame and trying the complete frame on the user until a satisfactory fit is accomplished.

4. The fitting set as defined in claim 2 wherein said frictional means comprises a soft porous coating.

5. The fitting set as defined in claim 2 wherein said frictional means comprises a rubber material.

6. A method for fitting an eyeglass frame on the nose of the user of the frame comprising the steps of:
   (a) providing an eyeglass frame with a removable nosepiece portion;
   (b) providing a plurality of first one piece, preformed, rigid, detachable and lockable nosepieces for said frame, each said nosepiece being formed to fit a different size and shape of nose and being constructed so as to be rigidly lockable on the frame;
   (c) providing a plurality of second one piece, preformed, rigid, detachable and lockable nosepieces for said frame, said second nosepieces being formed to fit different size and shape noses and being constructed so as to be rigidly lockable on the frame, said second nosepieces also having formed thereon frictional means; and
   (d) trying a plurality of said first and second nosepieces on the user of the frame by positioning and locking said nosepieces in said frame one at a time and trying each selected locked nosepiece and the frame on the user until a satisfactory fit is accomplished.

7. The method as defined in claim 6 wherein said frictional means comprises a soft porous coating.

8. The method as defined in claim 6 wherein said frictional means comprises a rubber material.

* * * * *